(12) United States Patent
Oyman (10) Patent No.: US 10,225,817 B2
(45) Date of Patent: *Mar. 5, 2019

(54) MTSI BASED UE CONFIGURABLE FOR VIDEO REGION-OF-INTEREST (ROI) SIGNALING

(71) Applicant: Intel IP Corporation, Santa Clara, CA (US)

(72) Inventor: Ozgur Oyman, San Jose, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/682,168

(22) Filed: Aug. 21, 2017

(65) Prior Publication Data

US 2017/0374647 A1    Dec. 28, 2017

Related U.S. Application Data

(63) Continuation of application No. 15/083,897, filed on Mar. 29, 2016, now Pat. No. 9,743,380, which is a
(Continued)

(51) Int. Cl.
*H04W 68/02* (2009.01)
*H04N 7/14* (2006.01)
(Continued)

(52) U.S. Cl.
CPC ............. *H04W 68/02* (2013.01); *H04J 11/00* (2013.01); *H04J 11/005* (2013.01);
(Continued)

(58) Field of Classification Search
CPC . H04W 68/02; G06T 7/0081; H04N 5/23216; H04N 7/15; H04N 19/17
(Continued)

(56) References Cited

U.S. PATENT DOCUMENTS 5,331,413 A    7/1994 Diner
5,617,422 A    4/1997 Litzenberger et al.
(Continued)

FOREIGN PATENT DOCUMENTS

CN    1783867 A    6/2006
CN    1934880 A    3/2007
(Continued)

OTHER PUBLICATIONS

"3GPP IMS WebRTC WID Overview", Alcatel-Lucent, Alcatel-Lucent Shanghai-Bell 3GPP TSG-SA WG1#60 S1-124342, [Online] Retrieved from the Internet :<URL:http://www.3gpp.org/ftp/tsg_sa/WG1_Serv/TSGS1_60_Edinburgh/docs/S1-124342.zip>.
(Continued)

*Primary Examiner* — Gerald Gauthier
(74) *Attorney, Agent, or Firm* — Schwegman Lundberg & Woessner, P.A.

(57) ABSTRACT

In a video conferencing application, a user viewing a scene can performing zooming by selecting an area in the scene, then dynamically switching a video feed of the scene to the selected area of the scene. The hardware and software of the video conferencing application can limit the video transmitted to the user to include only the selected area of the scene. Transmitting only the selected area of the scene, and excluding the non-selected area of the scene from transmission, can more efficiently use the available bandwidth of the video conferencing application.

25 Claims, 5 Drawing Sheets

Related U.S. Application Data continuation of application No. 14/109,121, filed on Dec. 17, 2013, now Pat. No. 9,307,192.

(60) Provisional application No. 61/816,662, filed on Apr. 26, 2013.

(51) Int. Cl.

| | | |
|---|---|---|
| H04W 76/14 | (2018.01) | |
| H04W 4/70 | (2018.01) | |
| H04W 76/27 | (2018.01) | |
| H04W 76/28 | (2018.01) | |
| H04W 28/02 | (2009.01) | |
| H04W 72/04 | (2009.01) | |
| H04W 52/02 | (2009.01) | |
| H04W 8/00 | (2009.01) | |
| H04L 5/00 | (2006.01) | |
| H04W 88/02 | (2009.01) | |
| H04W 36/00 | (2009.01) | |
| H04W 60/00 | (2009.01) | |
| H04L 29/06 | (2006.01) | |
| H04W 8/22 | (2009.01) | |
| H04J 11/00 | (2006.01) | |
| H04W 24/06 | (2009.01) | |
| H04W 72/12 | (2009.01) | |
| H04W 48/18 | (2009.01) | |
| H04L 12/14 | (2006.01) | |
| H04L 29/08 | (2006.01) | |
| H04L 1/18 | (2006.01) | |
| H04W 52/32 | (2009.01) | |
| H04N 7/15 | (2006.01) | |
| H04W 68/00 | (2009.01) | |
| H04L 12/26 | (2006.01) | |
| H04L 1/16 | (2006.01) | |
| H04W 52/08 | (2009.01) | |
| H04L 12/801 | (2013.01) | |
| H04W 48/06 | (2009.01) | |
| H04W 76/18 | (2018.01) | |
| H04W 76/38 | (2018.01) | |
| H04W 88/06 | (2009.01) | |
| H04N 21/4728 | (2011.01) | |
| H04N 21/4788 | (2011.01) | |
| H04N 21/6437 | (2011.01) | |
| H04W 52/14 | (2009.01) | |
| H04W 52/24 | (2009.01) | |

(52) U.S. Cl.
CPC ........ *H04J 11/0023* (2013.01); *H04L 1/1671* (2013.01); *H04L 1/1812* (2013.01); *H04L 5/005* (2013.01); *H04L 5/0007* (2013.01); *H04L 5/0032* (2013.01); *H04L 5/0033* (2013.01); *H04L 5/0073* (2013.01); *H04L 12/1407* (2013.01); *H04L 29/06068* (2013.01); *H04L 43/16* (2013.01); *H04L 47/12* (2013.01); *H04L 65/105* (2013.01); *H04L 65/1006* (2013.01); *H04L 65/1016* (2013.01); *H04L 65/1069* (2013.01); *H04L 65/1073* (2013.01); *H04L 65/602* (2013.01); *H04L 65/608* (2013.01); *H04L 65/80* (2013.01); *H04L 67/02* (2013.01); *H04L 67/10* (2013.01); *H04N 7/141* (2013.01); *H04N 7/147* (2013.01); *H04N 7/15* (2013.01); *H04W 4/70* (2018.02); *H04W 8/005* (2013.01); *H04W 8/22* (2013.01); *H04W 24/06* (2013.01); *H04W 28/0236* (2013.01); *H04W 28/0289* (2013.01); *H04W 36/0066* (2013.01); *H04W 48/18* (2013.01); *H04W 52/0212* (2013.01); *H04W 52/0216* (2013.01); *H04W 52/08* (2013.01); *H04W 52/32* (2013.01); *H04W 60/00* (2013.01); *H04W 68/00* (2013.01); *H04W 72/0446* (2013.01); *H04W 72/0486* (2013.01); *H04W 72/1231* (2013.01); *H04W 72/1278* (2013.01); *H04W 76/14* (2018.02); *H04W 76/27* (2018.02); *H04W 76/28* (2018.02); *H04W 88/02* (2013.01); *H04L 1/1861* (2013.01); *H04L 5/0044* (2013.01); *H04L 5/0055* (2013.01); *H04L 47/10* (2013.01); *H04N 21/4728* (2013.01); *H04N 21/4788* (2013.01); *H04N 21/6437* (2013.01); *H04W 48/06* (2013.01); *H04W 52/146* (2013.01); *H04W 52/242* (2013.01); *H04W 52/325* (2013.01); *H04W 76/18* (2018.02); *H04W 76/38* (2018.02); *H04W 88/06* (2013.01); *Y02D 70/00* (2018.01); *Y02D 70/1224* (2018.01); *Y02D 70/1226* (2018.01); *Y02D 70/1242* (2018.01); *Y02D 70/1244* (2018.01); *Y02D 70/1246* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/164* (2018.01); *Y02D 70/21* (2018.01); *Y02D 70/22* (2018.01); *Y02D 70/23* (2018.01); *Y02D 70/24* (2018.01); *Y02D 70/26* (2018.01)

(58) Field of Classification Search
USPC ............ 348/14.02, 14.07, 14.08, 14.09, 142, 348/14.16, 143, 77, 135; 375/240.01, 375/240.08, 240.12, 240.13, 240.26, 375/240.16; 381/92; 382/254, 103, 239, 382/282, 232; 455/458
See application file for complete search history.

(56) References Cited

U.S. PATENT DOCUMENTS

| | | |
|---|---|---|
| 5,686,957 A | 11/1997 | Baker |
| 5,963,203 A | 10/1999 | Goldberg et al. |
| 6,104,721 A | 8/2000 | Hsu |
| 6,573,907 B1 | 6/2003 | Madrane et al. |
| 6,677,985 B1* | 1/2004 | Kubota ................. G01S 7/5205 348/163 |
| 7,724,972 B2 | 5/2010 | Wang et al. |
| 7,801,328 B2* | 9/2010 | Au ..................... G06K 9/00771 345/156 |
| 8,009,735 B2 | 8/2011 | Le Leannec et al. |
| 8,019,170 B2* | 9/2011 | Wang ................. G06K 9/00234 348/404.1 |
| 8,019,175 B2 | 9/2011 | Lee et al. |
| 8,208,758 B2* | 6/2012 | Wang ................. G06K 9/00234 348/188 |
| 8,289,371 B2* | 10/2012 | Wagner .................. H04N 7/152 348/14.08 |
| 8,331,760 B2 | 12/2012 | Butcher |
| 8,358,613 B1 | 1/2013 | Giallorenzi et al. |
| 8,364,698 B2 | 1/2013 | Delgo et al. |
| 8,406,297 B2* | 3/2013 | Lu ......................... H04N 19/139 375/240.03 |
| 8,452,902 B2 | 5/2013 | Jang et al. |
| 8,570,359 B2 | 10/2013 | Ali et al. |
| 8,711,198 B2 | 4/2014 | Malzbender et al. |
| 8,830,892 B2 | 9/2014 | Chung et al. |
| 8,842,919 B2 | 9/2014 | Katz et al. |
| 8,890,923 B2* | 11/2014 | Tian ........................ H04N 7/15 348/14.03 |
| 8,922,718 B2 | 12/2014 | House et al. |
| 8,964,029 B2* | 2/2015 | Finn .................... G08B 13/1963 348/143 |

(56) References Cited

U.S. PATENT DOCUMENTS

| | | | |
|---|---|---|---|
| 8,970,653 B2 | 3/2015 | Bowen et al. | |
| 8,977,063 B2 | 3/2015 | Lee et al. | |
| 9,031,974 B2 | 5/2015 | Delgo et al. | |
| 9,055,216 B1 | 6/2015 | Taylor | |
| 9,247,203 B2* | 1/2016 | Li | H04N 7/15 |
| 9,288,434 B2 | 3/2016 | Bangolae et al. | |
| 9,294,714 B2 | 3/2016 | Gupta et al. | |
| 9,307,192 B2 | 4/2016 | Oyman | |
| 9,325,937 B2 | 4/2016 | Zaus et al. | |
| 9,392,539 B2 | 7/2016 | Yeh et al. | |
| 9,414,306 B2 | 8/2016 | Han et al. | |
| 9,619,887 B2* | 4/2017 | Anselmo | H04N 19/124 |
| 9,621,845 B2 | 4/2017 | Shan et al. | |
| 9,743,380 B2* | 8/2017 | Oyman | H04W 4/70 |
| 9,832,369 B2* | 11/2017 | Oyman | H04N 19/167 |
| 10,045,032 B2* | 8/2018 | Dzik | H04N 19/119 |
| 2004/0120591 A1 | 6/2004 | Brower et al. | |
| 2004/0192211 A1 | 9/2004 | Gallagher et al. | |
| 2004/0257432 A1* | 12/2004 | Girish | H04N 7/142 348/14.08 |
| 2005/0024487 A1 | 2/2005 | Chen | |
| 2005/0143084 A1 | 6/2005 | Cheng et al. | |
| 2005/0202823 A1 | 9/2005 | Shaheen et al. | |
| 2006/0062478 A1* | 3/2006 | Cetin | G08B 13/19652 382/232 |
| 2006/0215752 A1 | 9/2006 | Lee et al. | |
| 2006/0215753 A1* | 9/2006 | Lee | H04N 7/147 375/240.08 |
| 2006/0238444 A1 | 10/2006 | Wang et al. | |
| 2006/0238445 A1 | 10/2006 | Wang et al. | |
| 2006/0256851 A1* | 11/2006 | Wang | H04N 21/234327 375/240.01 |
| 2007/0024706 A1* | 2/2007 | Brannon, Jr. | H04N 7/17318 348/142 |
| 2007/0183661 A1 | 8/2007 | El-Maleh et al. | |
| 2007/0183663 A1 | 8/2007 | Wang et al. | |
| 2007/0291729 A1 | 12/2007 | Dalsgaard et al. | |
| 2008/0013621 A1 | 1/2008 | Wang et al. | |
| 2008/0089411 A1* | 4/2008 | Wenger | H04N 19/105 375/240.12 |
| 2008/0096566 A1 | 4/2008 | Brunner et al. | |
| 2008/0141239 A1 | 6/2008 | Larsson et al. | |
| 2008/0152245 A1* | 6/2008 | El-Maleh | H04N 21/4621 382/254 |
| 2008/0165861 A1* | 7/2008 | Wen | H04N 19/139 375/240.26 |
| 2008/0177889 A1 | 7/2008 | Beyer et al. | |
| 2008/0225116 A1* | 9/2008 | Kang | H04N 21/235 348/135 |
| 2008/0291265 A1 | 11/2008 | Wagner et al. | |
| 2009/0017826 A1 | 1/2009 | Shaheen | |
| 2009/0040955 A1 | 2/2009 | Jung et al. | |
| 2009/0089435 A1 | 4/2009 | Terrill et al. | |
| 2009/0111478 A1 | 4/2009 | Jallon | |
| 2009/0129388 A1 | 5/2009 | Akhtar et al. | |
| 2009/0147685 A1 | 6/2009 | Malhotra et al. | |
| 2009/0210766 A1 | 8/2009 | Katayama et al. | |
| 2009/0280802 A1 | 11/2009 | Chin et al. | |
| 2009/0323613 A1 | 12/2009 | Frederiksen et al. | |
| 2009/0323981 A1* | 12/2009 | Cutler | H04N 7/142 381/92 |
| 2010/0026781 A1* | 2/2010 | Ali | G06K 9/00234 348/14.08 |
| 2010/0045773 A1 | 2/2010 | Ritchey | |
| 2010/0067433 A1 | 3/2010 | Cheng et al. | |
| 2010/0074182 A1 | 3/2010 | Shao | |
| 2010/0081391 A1 | 4/2010 | Suzuki et al. | |
| 2010/0103245 A1* | 4/2010 | Decker | H04N 7/152 348/14.09 |
| 2010/0118111 A1* | 5/2010 | Bouazizi | H04N 7/142 348/14.08 |
| 2010/0130237 A1 | 5/2010 | Kitazoe et al. | |
| 2010/0178919 A1 | 7/2010 | Deepak et al. | |
| 2010/0202476 A1 | 8/2010 | Chun et al. | |
| 2010/0202561 A1 | 8/2010 | Gorokhov et al. | |
| 2010/0208607 A1 | 8/2010 | Chin et al. | |
| 2010/0220652 A1 | 9/2010 | Ishii et al. | |
| 2010/0238805 A1 | 9/2010 | Ludwig et al. | |
| 2010/0245537 A1* | 9/2010 | Yu | H04L 12/1822 348/14.08 |
| 2010/0304759 A1 | 12/2010 | Leppanen et al. | |
| 2010/0317394 A1 | 12/2010 | Harris et al. | |
| 2011/0019633 A1 | 1/2011 | Tajima et al. | |
| 2011/0032328 A1 | 2/2011 | Raveendran et al. | |
| 2011/0032329 A1 | 2/2011 | Bauza et al. | |
| 2011/0032338 A1 | 2/2011 | Raveendran et al. | |
| 2011/0051808 A1 | 3/2011 | Quast et al. | |
| 2011/0090302 A1 | 4/2011 | Leviav et al. | |
| 2011/0109716 A1 | 5/2011 | Choi | |
| 2011/0116495 A1 | 5/2011 | Purkayastha et al. | |
| 2011/0161441 A1 | 6/2011 | Haruna et al. | |
| 2011/0195710 A1 | 8/2011 | Nas et al. | |
| 2011/0217980 A1 | 9/2011 | Faurie et al. | |
| 2011/0217985 A1 | 9/2011 | Gorokhov | |
| 2011/0235706 A1 | 9/2011 | Demircin et al. | |
| 2011/0242975 A1 | 10/2011 | Zhao et al. | |
| 2011/0250888 A1 | 10/2011 | Ryu et al. | |
| 2011/0258313 A1 | 10/2011 | Mallik et al. | |
| 2011/0263255 A1 | 10/2011 | Alonso-rubio et al. | |
| 2011/0268084 A1 | 11/2011 | Tanabe et al. | |
| 2012/0008574 A1 | 1/2012 | Xiao et al. | |
| 2012/0026277 A1* | 2/2012 | Malzbender | H04N 7/15 348/14.07 |
| 2012/0083293 A1* | 4/2012 | Bejerano | H04W 68/02 455/458 |
| 2012/0087396 A1 | 4/2012 | Nimbalker et al. | |
| 2012/0120789 A1 | 5/2012 | Ramachandran et al. | |
| 2012/0122440 A1 | 5/2012 | Krishnamurthy et al. | |
| 2012/0151009 A1 | 6/2012 | Bouazizi et al. | |
| 2012/0176884 A1 | 7/2012 | Zhang et al. | |
| 2012/0201306 A1* | 8/2012 | Kang | H04N 21/235 375/240.16 |
| 2012/0281621 A1 | 11/2012 | Lotfallah et al. | |
| 2012/0287881 A1 | 11/2012 | Arnott et al. | |
| 2012/0307794 A1 | 12/2012 | Shaheen et al. | |
| 2012/0320141 A1 | 12/2012 | Bowen et al. | |
| 2013/0039180 A1 | 2/2013 | Hong et al. | |
| 2013/0039339 A1 | 2/2013 | Rayavarapu et al. | |
| 2013/0040671 A1 | 2/2013 | Zawaideh et al. | |
| 2013/0042279 A1 | 2/2013 | Sato et al. | |
| 2013/0044697 A1 | 2/2013 | Yoo et al. | |
| 2013/0045707 A1 | 2/2013 | Lee et al. | |
| 2013/0051277 A1 | 2/2013 | Hakola et al. | |
| 2013/0101035 A1 | 4/2013 | Wang et al. | |
| 2013/0101036 A1 | 4/2013 | Zhou | |
| 2013/0170415 A1 | 7/2013 | Fukuta et al. | |
| 2013/0170479 A1 | 7/2013 | Fong et al. | |
| 2013/0195074 A1 | 8/2013 | Keller et al. | |
| 2013/0201824 A1 | 8/2013 | Venkatachalam et al. | |
| 2013/0244657 A1 | 9/2013 | Wang et al. | |
| 2013/0258919 A1 | 10/2013 | Damnjanovic | |
| 2013/0259114 A1 | 10/2013 | Carlsson et al. | |
| 2013/0266004 A1 | 10/2013 | Nunez | |
| 2013/0273904 A1 | 10/2013 | Wehmeier et al. | |
| 2013/0301499 A1 | 11/2013 | Jain et al. | |
| 2013/0301501 A1 | 11/2013 | Olvera-Hernandez et al. | |
| 2014/0059166 A1 | 2/2014 | Mann et al. | |
| 2014/0176663 A1* | 6/2014 | Cutler | H04N 7/142 348/14.07 |
| 2014/0211858 A1 | 7/2014 | Zhao et al. | |
| 2014/0219088 A1 | 8/2014 | Oyman et al. | |
| 2014/0225918 A1 | 8/2014 | Mittal et al. | |
| 2014/0256327 A1 | 9/2014 | Wang et al. | |
| 2014/0259127 A1 | 9/2014 | Shaw et al. | |
| 2014/0286215 A1 | 9/2014 | Koc et al. | |
| 2014/0295864 A1 | 10/2014 | Gunnarsson et al. | |
| 2014/0320587 A1* | 10/2014 | Oyman | H04W 4/70 348/14.07 |
| 2014/0321272 A1 | 10/2014 | Bangolae et al. | |
| 2014/0321343 A1 | 10/2014 | Gupta et al. | |
| 2014/0321360 A1 | 10/2014 | Han et al. | |
| 2014/0321369 A1 | 10/2014 | Davydov et al. | |
| 2014/0323128 A1 | 10/2014 | Zaus et al. | |

(56) References Cited

U.S. PATENT DOCUMENTS

| | | |
|---|---|---|
| 2014/0323133 A1 | 10/2014 | Yeh et al. |
| 2014/0325078 A1 | 10/2014 | Shan et al. |
| 2015/0195490 A1* | 7/2015 | Oyman ............... H04L 65/608 348/14.02 |
| 2015/0230198 A1 | 8/2015 | Karampatsis et al. |
| 2015/0237577 A1 | 8/2015 | Zhang et al. |
| 2015/0327215 A1 | 11/2015 | Xu |
| 2016/0007252 A1 | 1/2016 | Larmo et al. |
| 2016/0036541 A1 | 2/2016 | Siomina et al. |
| 2016/0057806 A1 | 2/2016 | Wittberg et al. |
| 2016/0100099 A1 | 4/2016 | Oyman et al. |
| 2016/0165185 A1 | 6/2016 | Oyman |
| 2016/0227166 A1 | 8/2016 | Oyman |
| 2017/0055239 A1 | 2/2017 | Gupta Hyde et al. |
| 2017/0374647 A1* | 12/2017 | Oyman ................ H04W 4/70 |

FOREIGN PATENT DOCUMENTS

| | | |
|---|---|---|
| CN | 101686227 A | 3/2010 |
| CN | 101771615 A | 7/2010 |
| CN | 102176790 A | 9/2011 |
| CN | 102318251 A | 1/2012 |
| CN | 102461248 A | 5/2012 |
| CN | 102547984 A | 7/2012 |
| CN | 103299569 A | 9/2013 |
| CN | 105009482 A | 10/2015 |
| CN | 105052109 A | 11/2015 |
| CN | 105052202 A | 11/2015 |
| CN | 1051103622 A | 11/2015 |
| CN | 105324952 A | 2/2016 |
| CN | 105340327 A | 2/2016 |
| CN | 105009482 B | 5/2018 |
| EP | 2046078 A1 | 4/2009 |
| EP | 2166693 A2 | 3/2010 |
| EP | 2187677 A1 | 5/2010 |
| EP | 2849494 A1 | 3/2015 |
| EP | 2922336 A1 | 9/2015 |
| EP | 3094063 B1 | 3/2018 |
| JP | 2008518536 A | 5/2008 |
| JP | 2009520390 A | 5/2009 |
| JP | 2012527796 A | 11/2012 |
| JP | 2016517234 A | 6/2016 |
| JP | 6138340 B2 | 5/2017 |
| JP | 2017195603 A | 10/2017 |
| KR | 20080067273 A | 7/2008 |
| KR | 1020090006281 A | 1/2009 |
| KR | 20100054015 A | 5/2010 |
| KR | 1020110051787 A | 5/2011 |
| KR | 1020110102935 A | 9/2011 |
| KR | 1020120099805 A | 9/2012 |
| KR | 101825073 B1 | 1/2018 |
| TW | 201215213 A | 4/2012 |
| TW | 201246954 A | 11/2012 |
| TW | 201301920 A | 1/2013 |
| TW | 201446026 A | 12/2014 |
| TW | 201501498 A | 1/2015 |
| TW | 201507374 A | 2/2015 |
| TW | 201631957 A | 9/2016 |
| TW | I559714 B | 11/2016 |
| TW | I559776 B | 11/2016 |
| TW | I559790 B | 11/2016 |
| TW | I578723 B | 4/2017 |
| TW | I578796 B | 4/2017 |
| WO | WO-2007053851 A2 | 5/2007 |
| WO | WO-2009025535 | 2/2009 |
| WO | WO-2010028307 A1 | 3/2010 |
| WO | WO-2010030952 A2 | 3/2010 |
| WO | WO-2010141911 A2 | 12/2010 |
| WO | WO-2011150252 A1 | 12/2011 |
| WO | WO-2012044327 A1 | 4/2012 |
| WO | WO-2012065658 A1 | 5/2012 |
| WO | WO-2013025040 A2 | 2/2013 |
| WO | WO-2013052440 A1 | 4/2013 |
| WO | WO-2014160765 A1 | 10/2014 |
| WO | WO-2014176058 A1 | 10/2014 |
| WO | WO-2014176087 A1 | 10/2014 |
| WO | WO-2014176089 A1 | 10/2014 |
| WO | WO-2014176106 A1 | 10/2014 |
| WO | WO-2014176200 A1 | 10/2014 |
| WO | WO-2014176245 A1 | 10/2014 |
| WO | WO-2014176480 A1 | 10/2014 |

OTHER PUBLICATIONS

"3rd Generation Partnership Project; Technical Specification Group Radio Access Network; Evolved Universal Terrestrial Radio Access (E-UTRA); Physical layer procedures (Release 11)", 3GPP TS 36.213 V11.4.0, (Dec. 2013), 182.

"3rd Generation Partnership Project; Technical Specification Group Services and System Aspects; General Packet Radio Service (GPRS); Service description; Stage 2 (Release 12)", 3GPP Standard; 3GPP TS 23.060, 3rd Generation Partnership Project (3GPP), Mobile Competence Centre ; 650, Route Deslucioles ; F-06921 Sophia-Antipolis Cedex ; France, vol. SA WG2, No. V12.0.0, (Mar. 5, 2013), 1-338.

"3rd Generation Partnership Project; Technical Specification Group Services and System Aspects; Machine-Type and other Mobile Data Applications Communications Enhancements", 3GPP Standard; 3GPP TR 23.887, 3rd Generation Partnership Project, vol. SA WG2, No. V0.9.0, (Apr. 24, 2013), 1-121 pgs.

"U.S. Appl. No. 14/107,400, Advisory Action dated Jan. 21, 2016", 3 pgs.

"U.S. Appl. No. 14/107,400, Final Office Action dated Oct. 7, 2015", 32 pgs.

"U.S. Appl. No. 14/107,400, Non Final Office Action dated May 27, 2015", 21 pgs.

"U.S. Appl. No. 14/107,400, Notice of Allowance dated Mar. 2, 2016", 9 pgs.

"U.S. Appl. No. 14/107,400, Response filed Jan. 5, 2016 to Non Final Office Action dated Oct. 7, 2015", 10 pgs.

"U.S. Appl. No. 14/107,400, Response filed Aug. 26, 2015 to Non Final Office Action dated May 27, 2015", 10 pgs.

"U.S. Appl. No. 14/109,121, Corrected Notice of Allowance dated Jan. 7, 2016", 2 pgs.

"U.S. Appl. No. 14/109,121, Corrected Notice of Allowance dated Mar. 1, 2016", 2 pgs.

"U.S. Appl. No. 14/109,121, Non Final Office Action dated Apr. 29, 2015", 6 pgs.

"U.S. Appl. No. 14/109,121, Non Final Office Action dated Aug. 14, 2015", 8 pgs.

"U.S. Appl. No. 14/109,121, Notice of Allowance dated Nov. 25, 2015", 9 pgs.

"U.S. Appl. No. 14/109,121, Response filed Nov. 13, 2015 to Non Final Office Action dated Aug. 14, 2015", 10 pgs.

"U.S. Appl. No. 14/109,121, Response filed Jul. 28, 2015 to Non Final Office Action dated Apr. 29, 2015", 10 pgs.

"U.S. Appl. No. 14/132,525, Examiner Interview Summary dated May 28, 2015", 3 pgs.

"U.S. Appl. No. 14/132,525, Non Final Office Action dated May 7, 2015", 15 pgs.

"U.S. Appl. No. 14/132,525, Notice of Allowance dated Dec. 22, 2015", 9 pgs.

"U.S. Appl. No. 14/132,525, Response filed Aug. 7, 2015 to Non Final Office Action dated May 7, 2015", 14 pgs.

"U.S. Appl. No. 14/132,974, Non Final Office Action dated Jul. 10, 2015", 8 pgs.

"U.S. Appl. No. 14/132,974, Notice of Allowance dated Nov. 16, 2015", 7 pgs.

"U.S. Appl. No. 14/132,974, Response filed Oct. 2, 2015 to Non Final Office Action dated Jul. 10, 2015", 7 pgs.

"U.S. Appl. No. 14/135,265, Advisory Action dated May 20, 2016", 4 pgs.

"U.S. Appl. No. 14/135,265, Final Office Action dated Feb. 11, 2016", 13 pgs.

"U.S. Appl. No. 14/135,265, Non Final Office Action dated Jul. 29, 2015", 11 pgs.

(56) References Cited

OTHER PUBLICATIONS

"U.S. Appl. No. 14/135,265, Response filed Apr. 11, 2015 to Final Office Action dated Feb. 11, 2016", 11 pgs.
"U.S. Appl. No. 14/135,265, Response filed Oct. 28, 2015 to Non Final Office Action dated Jul. 29, 2015", 8 pgs.
"U.S. Appl. No. 14/140,823, Non Final Office Action dated Aug. 5, 2015", 6 pgs.
"U.S. Appl. No. 14/140,823, Non Final Office Action dated Nov. 23, 2015", 11 pgs.
"U.S. Appl. No. 14/140,823, Notice of Allowance dated Apr. 6, 2016", 5 pgs.
"U.S. Appl. No. 14/140,823, Preliminary Amendment filed Mar. 26, 2014", 3 pgs.
"U.S. Appl. No. 14/140,823, Response filed Feb. 23, 2016 to Non Final Office Action dated Nov. 23, 2015", 8 pgs.
"U.S. Appl. No. 14/140,823, Response filed Nov. 5, 2015 to Non Final Office Action dated Aug. 5, 2015", 7 pgs.
"U.S. Appl. No. 14/141,034, Non Final Office Action dated Feb. 25, 2016", 10 pgs.
"U.S. Appl. No. 14/141,034, Notice of Allowance dated Jul. 22, 2016", 5 pgs.
"U.S. Appl. No. 14/141,034, Preliminary Amendment filed Dec. 26, 2014", 7 pgs.
"U.S. Appl. No. 14/141,034, Response filed May 25, 2016 to Non Final Office Action dated Feb. 25, 2016", 10 pgs.
"U.S. Appl. No. 14/141,985, Non Final Office Action dated Jul. 8, 2015", 20 pgs.
"U.S. Appl. No. 14/141,985, Notice of Allowance dated Oct. 26, 2015", 18 pgs.
"U.S. Appl. No. 14/141,985, Response filed Oct. 2, 2015 to Non Final Office Action dated Jul. 8, 2015", 7 pgs.
"U.S. Appl. No. 15/076,500, Non Final Office Action dated Oct. 18, 2017", 7 pgs.
"U.S. Appl. No. 15/076,500, Response filed Jan. 17, 2018 to Non Final Office Action dated Oct. 18, 2017", 7 pgs.
"U.S. Appl. No. 15/076,500. Preliminary Amendment filed Dec. 21, 2016", 6 pgs.
"U.S. Appl. No. 15/083,897, Corrected Notice of Allowance dated May 3, 2017", 2 pgs.
"U.S. Appl. No. 15/083,897, Corrected Notice of Allowance dated May 31, 2017", 2 pgs.
"U.S. Appl. No. 15/083,897, Corrected Notice of Allowance dated Jul. 24, 2017", 2 pgs.
"U.S. Appl. No. 15/083,897, Non Final Office Action dated Jan. 3, 2017", 15 pgs.
"U.S. Appl. No. 15/083,897, Notice of Allowance dated Apr. 19, 2017", 10 pgs.
"U.S. Appl. No. 15/083,897, Preliminary Amendment filed Apr. 19, 2016", 9 pgs.
"U.S. Appl. No. 15/083,897, Response filed Mar. 21, 2017 to Non Final Office Action dated Jan. 3, 2017", 14 pgs.
"U.S. Appl. No. 15/483,831, Preliminary Amendment filed May 12, 2017", 7 pgs.
"Chinese Application Serial No. 201480010553.3, Office Action dated May 24, 2017", Not in English, 9 pgs.
"Chinese Application Serial No. 201480010553.3, Office Action dated Oct. 27, 2017", w/English Translation, 8 pgs.
"Chinese Application Serial No. 201480010553.3, Response Filed Oct. 9, 2017 to Office Action dated May 24, 2017", (W/ English Claims), 9 pgs.
"Chinese Application Serial No. 201480010553.3, Resposne filed Jan. 11, 2018 to Office Action dated Oct. 27, 2017", (W/ English Claims), 8 pgs.
"Chinese Application Serial No. 201480017167.7, Office Action dated Jan. 2, 2018", w/English Translation, 23 pgs.
"Chinese Application Serial No. 201480017266.5, Office Action dated Jul. 5, 2017", Without English Translation, 7 pgs.
"Chinese Application Serial No. 201480017266.5, Response filed Nov. 20, 2017 to Office Action dated Jul. 5, 2017", (W/ English Claims), 5 pgs.

"Control Signaling to Support for Enhanced DL MIMO", R1-104021, 3GPP TSG RAN WG1 Meeting #61bis, (2010), 6 pgs.
"Discussion on scenarios for evaluation of interference cancellation and suppression schemes", R1-130927, 3GPP TSG-RAN WG1 #72bis, (2013), 3 pgs.
"European Application Serial No. 14774018.7, Extended European Search Report dated Nov. 29, 2016", 9 pgs.
"European Application Serial No. 14774018.7, Response Filed Jun. 26, 2017 to Extended European Search Report dated Nov. 29, 2016", 14 pgs.
"European Application Serial No. 14787776.5, Communication Pursuant to Rule 164(1) EPC dated Dec. 12, 2016", 8 pgs.
"European Application Serial No. 14787776.5, Extended European Search Report dated Mar. 24, 2017", 12 pgs.
"European Application Serial No. 14787776.5, Response filed Oct. 20, 2017 to Extended European Search Report dated Mar. 24, 2017", 7 pgs.
"European Application Serial No. 14787874.8, Extended European Search Report dated Dec. 9, 2016", 5 pgs.
"European Application Serial No. 14787874.8, Response Filed Jul. 12, 2017 to Extended European Search Report dated Dec. 9, 2016", 11 pgs.
"European Application Serial No. 14787987.8, Extended European Search Report dated Jan. 25, 2017", 9 pgs.
"European Application Serial No. 14787987.8, Response Filed Jul. 25, 2017 to Extended European Search Report dated Jan. 25, 2017", 12 pgs.
"European Application Serial No. 14788192.4, Extended European Search Report dated Nov. 8, 2016", 9 pgs.
"European Application Serial No. 14788192.4, Response Filed May 22, 2017 to Extended European Search Report dated Nov. 8, 2016", 10 pgs.
"European Application Serial No. 14788589.1, Communication Pursuant to Article 94(3) EPC dated Dec. 6, 2017", 5 pgs.
"European Application Serial No. 14788589.1, Extended European Search Report dated Oct. 7, 2016", 10 pgs.
"European Application Serial No. 14788589.1, Response Filed Apr. 27, 2017 to Extended European Search Report dated Oct. 7, 2016", 8 pgs.
"European Application Serial No. 14788674.1, Extended European Search Report dated Nov. 23, 2016", 8 pgs.
"European Application Serial No. 14788674.1, Response Filed Jun. 9, 2017 to Extended European Search Report dated Nov. 23, 2016", 14 pgs.
"European Application Serial No. 14788741.8, Extended European Search Report dated Oct. 20, 2016", 7 pgs.
"European Application Serial No. 14788741.8, Response Filed May 8, 2017 to Extended European Search Report dated Oct. 20, 2016", 14 pgs.
"European Application Serial No. 16168880.9, Extended European Search Report dated Oct. 10, 2016", 6 pgs.
"International Application Serial No. PCT/US2014/031845, International Preliminary Report on Patentability dated Oct. 8, 2015", 6 pgs.
"International Application Serial No. PCT/US2014/031845, International Search Report dated Aug. 26, 2014", 3 pgs.
"International Application Serial No. PCT/US2014/031845, Written Opinion dated Aug. 26, 2014", 4 pgs.
"International Application Serial No. PCT/US2014/033965, International Preliminary Report on Patentability dated Nov. 5, 2015", 7 pgs.
"International Application Serial No. PCT/US2014/033965, International Search Report dated Aug. 7, 2014", 3 pgs.
"International Application Serial No. PCT/US2014/033965, Written Opinion dated Aug. 7, 2014", 5 pgs.
"International Application Serial No. PCT/US2014/034307, International Preliminary Report on Patentability dated Nov. 5, 2015", 7 pgs.
"International Application Serial No. PCT/US2014/034307, International Search Report dated Aug. 11, 2014", 3 pgs.
"International Application Serial No. PCT/US2014/034307, Written Opinion dated Aug. 11, 2014", 5 pgs.

(56) References Cited

OTHER PUBLICATIONS

"International Application Serial No. PCT/US2014/034337, International Preliminary Report on Patentability dated Nov. 5, 2015", 8 pgs.
"International Application Serial No. PCT/US2014/034337, International Search Report dated Aug. 8, 2014", 3 pgs.
"International Application Serial No. PCT/US2014/034337, Written Opinion dated Aug. 8, 2014", 6 pgs.
"International Application Serial No. PCT/US2014/034480, International Preliminary Report on Patentability dated Nov. 5, 2015", 6 pgs.
"International Application Serial No. PCT/US2014/034480, International Search Report dated Aug. 26, 2014", 3 pgs.
"International Application Serial No. PCT/US2014/034480, Written Opinion dated Aug. 26, 2014", 4 pgs.
"International Application Serial No. PCT/US2014/034879, International Preliminary Report on Patentability dated Nov. 5, 2015", 10 pgs.
"International Application Serial No. PCT/US2014/034879, International Search Report dated Aug. 28, 2014", 3 pgs.
"International Application Serial No. PCT/US2014/034879, Written Opinion dated Aug. 28, 2014", 8 pgs.
"International Application Serial No. PCT/US2014/034966, International Preliminary Report on Patentability dated Nov. 5, 2015", 7 pgs.
"International Application Serial No. PCT/US2014/034966, International Search Report dated Aug. 22, 2014", 3 pgs.
"International Application Serial No. PCT/US2014/034966, Written Opinion dated Aug. 22, 2014", 5 pgs.
"International Application Serial No. PCT/US2014/035409, International Preliminary Report on Patentability dated Nov. 5, 2015", 8 pgs.
"International Application Serial No. PCT/US2014/035409, International Search Report dated Aug. 26, 2014", 4 pgs.
"International Application Serial No. PCT/US2014/035409, Written Opinion dated Aug. 26, 2014", 6 pgs.
"Japanese Application Serial No. 2016-505623, Office Action dated Oct. 11, 2016", W/ English Translation, with English Translation, 5 pgs.
"Japanese Application Serial No. 2016-505623, Response filed Feb. 4, 2017 to Office Action dated Oct. 11, 2016", (W/ English Claims), 21 pgs.
"Korean Application 2015-7026489 Response filed Jan. 18, 2017 to Office Action dated Nov. 18, 2016", w/ Claims in English, 37 pgs.
"Korean Application Serial No. 2015-7026489, Final Office Action dated Apr. 12, 2017", (English Translation), 4 pgs.
"Korean Application Serial No. 2015-7026489, Office Action dated Nov. 18, 2016", (English Translation), 10 pgs.
"Korean Application Serial No. 2015-7026489, Response Filed Jun. 12, 2017 to Final Office Action dated Apr. 12, 2017", (W/ English Claims), 7 pgs.
"Korean Application Serial No. 2017-7001580, Final Office Action dated Aug. 28, 2017", W/ English Translation, 6 pgs.
"Korean Application Serial No. 2017-7001580, Final Office Action dated Nov. 15, 2017", w/English Translation, 5 pgs.
"Korean Application Serial No. 2017-7001580, Office Action dated Feb. 9, 2017", (W/ English Translation), 9 pgs.
"Korean Application Serial No. 2017-7001580, Request for Continued Examination filed on Oct. 25, 2017", (W/ English Claims), 14 pgs.
"Korean Application Serial No. 2017-7001580, Response Filed Apr. 5, 2017 to Office Action dated Feb. 9, 2017", (W/ English Claims), 14 pgs.
"Korean Application Serial No. 2017-7001580, Voluntary Amendment filed on Jun. 12, 2017", (Associate letter W/ English Claims), 5 pgs.
"MIME Type Registration for RTP Payload Format for H.224; rfc4573.txt", Even a Lochbaum Polycom R 5.' JCT-VC Meeting; 96. MPEG Meeting XP015O55010,, [Online] Retrieved from the Internet :<http://wftp3.itu.int/av-arch/jctvc-site/>, (Jul. 1, 2006).

"ROI Permanent Document Requirements, Working Assumptions and Potential Solutions", Intel (ROI Rapporteur): 3Gpp Draft; S4150446_ROI_Permanent_Document_V110_Final, 3rd Generation Partnership Project (3GPP), Mobile Competence Centre ; 650, Route Des Lucioles ; F-06921 Sophia-Antipolis Cedex ; France vol. SA WG4, No. Bratislava , Slovakia, [Online] Retrieved from the Internet : <http ://www.3gpp.org/ftp/Meeti ngs_3GPPSYNC/SA4/Docs/>, (Apr. 16, 2015), Apr. 13-17, 2015.
"Taiwanese Application Serial No. 103113700, Office Action dated Oct. 28, 2015", W/ English Search Report, 9 pgs.
"Taiwanese Application Serial No. 103113700, Response filed Apr. 28, 2016 to Office Action dated Oct. 28, 2015", W/ English Claims, 66 pgs.
"Taiwanese Application Serial No. 103113875, Amendment filed Oct. 16, 2014", English Translation, 2 pgs.
"Taiwanese Application Serial No. 103113875, Office Action dated Mar. 25, 2016", W/ English Translation, 5 pgs.
"Taiwanese Application Serial No. 103113875, Office Action dated Sep. 22, 2016", W/ English Translation, 14 pgs.
"Taiwanese Application Serial No. 103113875, Office Action dated Oct. 8, 2015", W/ English Translation, 22 pgs.
"Taiwanese Application Serial No. 103113875, Response filed Jan. 13, 2016 to Office Action dated Oct. 8, 2015", (English Translation of Claims), 13 pgs.
"Taiwanese Application Serial No. 103113875, Response filed Jun. 24, 2016 to Office Action dated Mar. 25, 2016", W/ English Claims, 10 pgs.
"Taiwanese Application Serial No. 103113875, Response filed Dec. 21, 2016 to Office Action dated Sep. 22, 2016", w/ English Claims, 17 pgs.
"Taiwanese Application Serial No. 103113876, Office Action dated Apr. 25, 2016", W/ English Translation, 16 pgs.
"Taiwanese Application Serial No. 103113876, Office Action dated Aug. 29, 2016", W/ English Translation, 5 pgs.
"Taiwanese Application Serial No. 103113876, Response filed Jul. 22, 2016 to Office Action dated Apr. 25, 2016", W/ English Claims, 12 pgs.
"Taiwanese Application Serial No. 103113876, Response Filed Feb. 17, 2017 to Office Action dated Aug. 29, 2016", w/ Claims in English, 13 pgs.
"Taiwanese Application Serial No. 103113897, Office Action dated Dec. 14, 2015", W/ English Search Report, 7 pgs.
"Taiwanese Application Serial No. 103113898, Office Action dated Sep. 17, 2015", W/ English Search Report, 9 pgs.
"Taiwanese Application Serial No. 103113898, Response filed Mar. 17, 2016 to Office Action dated Sep. 17, 2015", W/ English Claims, 31 pgs.
"Taiwanese Application Serial No. 105115759, Office Action dated Aug. 24, 2016", W/ English Claims, 2 pgs.
"Taiwanese Application Serial No. 105115759, Response filed Nov. 21, 2016 to Office Action dated Aug. 24, 2016", w/ English Claims, 39 pgs.
"Views on the use of DM RS ports / scrambling sequences for MU-MIMO", 3GPP TSG-RAN WG1 Meeting #61bis R1-103830 Dresden, (Jun. 28-Jul. 2, 2010).
"Views on the use of DM RS ports / scrambling sequences for MU-MIMO", R1-103830, 3GPP TSG-RAN WG1 Meeting #61bis, (2010), 6 pgs.
3GPP TSG-RAN WG4#64, "On CRS interference handling for RRM and demodulation performance testing", 7 pgs.
Alcatel-Lucent, "WebRTC INS SystemS and WebRTC Proprietary Islands", [Online]. Retrieved from the Internet: <http://www.tmcnetcom/tmc/whitepapers/documents/whitepapers/2013/8641-alcatel-lucent-webrtc-ims-systems-webrtc-proprietary-islands.pdf>, (Jan. 1, 2003), 1-22.
Ericsson, et al., "Continued Discussion on Transfer of large size UE EUTRA capabilities", 3GPP Draft; R2-131261 UE EUTRA Cap at HO From Geran, 3rd Generation Partnership Project (3GPP), Mobile Competence Centre; 650, Route Deslucioles; F-06921 Sophia-Antipolis Cedex ; France vol. RAN WG2, No. Chicago , USA;, (Apr. 6, 2013).
O'Leary, "WebRTC Overview", 3GPP/SA3-LI#49, Tdoc SA3LI13_047, (Apr. 9, 2013).

(56) References Cited

OTHER PUBLICATIONS

Suckchel, Yang, "An Adaptive Discontinuous Reception Mechanism Based on Extended Paging Indicator for Power Saving in UMTS", In: Vehicular Technology Conference, VTC-2006 Fall. IEEE 64th, [Online]. Retrieved from the Internet: http://i.eexplore.ieee.org/stamp/stamp.jsparnumber=4109444>, (2006), 5 pgs.
Tian, Gaohui, et al., "Device-to-Device Terminal Discovery Mechanism and Initial Synchronization Based on Pseudo PRACH; 16-12-0702-00-Gcon-device-to-device-terminal-discovery-mechanism-and-initial-synchronization-based-on-pseudo-prach", IEEE SA Mentor; 16-12-0702-00-Gcon-Device-to-Device-Terminal-Discovery-Mechanism-and-Initial-Synchronization-Based-on-Pseudo-Prach, IEEE-SA Mentor, Piscataway, NJ USA, vol. 802.16, (Dec. 2, 2012), 1-9.
U.S. Appl. No. 14/132,974 U.S. Pat. No. 9,294,714, filed Dec. 18, 2013, User Equipment and Methods for Adapting System Parameters Based on Extended Paging Cycles.
U.S. Appl. No. 15/076,500, filed Mar. 21, 2016, User Equipment and Methods for Adapting System Parameters Based on Extended Paging Cycles.
U.S. Appl. No. 14/141,034 U.S. Pat. No. 9,621,845, filed Dec. 26, 2013, Architecture for Web-Based Real-Time Communications (WebRTC) to Access Internet Protocol Multimedia Subsystem (IMS).
U.S. Appl. No. 14/109,121 U.S. Pat. No. 9,307,192, filed Dec. 17, 2013, Interactive Zooming in Video Conferencing.
U.S. Appl. No. 15/083,897 U.S. Pat. No. 9,743,380, filed Mar. 29, 2016, MTSI Based UE Configurable for Video Region-of-Interest (ROI) Signaling.
U.S. Appl. No. 14/135,265, filed Dec. 19, 2013, System and Method for Interference Cancellation and/or Supression on Physical Downlink Shared Channel at the User Equipment.
U.S. Appl. No. 14/107,400 U.S. Pat. No. 9,392,539, filed Dec. 16, 2013, User Equipment and Method for Feedback of User Equipment Performance Metrics During Dynamic Radio Switching.
U.S. Appl. No. 14/132,525 U.S. Pat. No. 9,325,937, filed Dec. 18, 2013, Radio Access Technology Information Storage in a Mobile Network.
U.S. Appl. No. 14/140,823 U.S. Pat. No. 9,414,306, filed Dec. 26, 2013, Device-To-Device (D2D) Preamble Design.
U.S. Appl. No. 14/141,985 U.S. Pat. No. 9,288,434, filed Dec. 27, 2013, Apparatus and Method for Congestion Control in Wireless Communication Networks.
"3rd Generation Partnership Project; Technical Specification Group Radio Access Network; Requirements for support of radio resource management (FDD)", 3GPP TS 25.133 V10..0.0, Release 10, (Dec. 2010), 258 pgs.
"U.S. Appl. No. 15/076,500, Non Final Office Action dated Mar. 22, 2018", 17 pgs.
"Chinese Application Serial No. 201480017167.7, Office Action dated Jun. 11, 2018", w/ Concise Statement of Relevance, 4 pgs.
"Chinese Application Serial No. 201480017167.7, Response filed May 7, 2018 to Office Action dated Jan. 2, 2018", W/ English Claims, 14 pgs.
"Chinese Application Serial No. 201480017187.4, Office Action dated Feb. 24, 2018", (W/ English Translation), 15 pgs.
"Chinese Application Serial No. 201480017237.9, Office Action dated Dec. 25, 2017", w/ English Translation, 15 pgs.
"Chinese Application Serial No. 201480017237.9, Response filed May 8, 2018 to Office Action dated Dec. 25, 2017", W/ English Claims, 23 pgs.
"Chinese Application Serial No. 201480017266.5, Office Action dated Feb. 1, 2018", w/English Translation, 10 pgs.
"Chinese Application Serial No. 201480017266.5, Response filed Apr. 16, 2018 to Office Action dated Feb. 1, 2018", W/ English Claims, 10 pgs.
"European Application Serial No. 14788589.1, Response filed Apr. 6, 2018 to Communication Pursuant to Article 94(3) EPC dated Dec. 6, 2017", 2 pgs.
"European Application Serial No. 14788741.8, Communication Pursuant to Article 94(3) EPC dated Jan. 8, 2018", 5 pgs.
"European Application Serial No. 14788741.8, Communication Pursuant to Article 94(3) EPC dated May 22, 2018", 5 pgs.
"European Application Serial No. 14788741.8, Response filed May 4, 2018 to Communication Pursuant to Article 94(3) EPC dated Jan. 8, 2018", 3 pgs.
"Taiwanese Application Serial No. 106102708, Office Action dated Jan. 19, 2018", w/ Concise Statement of Relevance, 5 pgs.
"Taiwanese Application Serial No. 106102708, Response filed Apr. 20, 2018 to Office Action dated Jan. 19, 2018", W/ English Claims, 17 pgs.
"Taiwanese Application Serial No. 106111401, Office Action dated May 9, 2018", W/ English Translation, 16 pgs.
Presta, Roberta, "Real-time and content-aware applications and infrastructure a holistic approach dealing with architectural performance and security issues", Ph.D. Thesis, The University of Naples Federico II,, [Online] Retrieved from the internet: <http://www.fedoa.unina.it/9396/1/tesidottorato-roberta-presta-XXV.pdf>, (Apr. 2, 2013), 193 pgs.
"U.S. Appl. No. 15/076,500, Final Office Action dated Sep. 13, 2018", 19 pgs.
"U.S. Appl. No. 15/076,500, Response filed Jul. 20, 2018 to Non Final Office Action dated Mar. 22, 2018", 8 pgs.
"Chinese Application Serial No. 201480017167.7, Response filed Aug. 20, 2018 to Office Action dated Jun. 11, 2018", W/ English Claims, 15 pgs.
"Chinese Application Serial No. 201480017237.9, Office Action dated Sep. 12, 2018", w/ Concise Explanation of Relevance, 7 pgs.
"European Application Serial No. 14788741.8, Communication Pursuant to Article 94(3) EPC dated Jul. 27, 2018", 7 pgs.
"European Application Serial No. 14788741.8, Response filed Jul. 20, 2018 to Communication Pursuant to Article 94(3) EPC dated May 22, 2018", 12 pgs.
"Japanese Application Serial No. 2017-086494, Office Action dated Jul. 3, 2018", w/ English translation, 6 pgs.
"Taiwanese Application Serial No. 106111401, Response filed Aug. 7, 2018 to Office Action dated May 9, 2018", W/ English Claims, 13 pgs.

* cited by examiner

MTSI BASED UE CONFIGURABLE FOR VIDEO REGION-OF-INTEREST (ROI) SIGNALING

PRIORITY APPLICATION

This application is a continuation of U.S. application Ser. No. 15/083,897, filed Mar. 29, 2016, now issued as U.S. Pat. No. 9,743,380, which is a continuation of U.S. application Ser. No. 14/109,121, filed Dec. 17, 2013, now issued as U.S. Pat. No. 9,307,192, which claims the benefit of priority to U.S. Provisional Patent Application Ser. No. 61/816,662, filed Apr. 26, 2013, all of which are incorporated herein by reference in their entirety.

TECHNICAL FIELD

Embodiments pertain to operations and communications performed by electronic devices in wireless networks. Some embodiments relate to conversational video sessions occurring over wireless networks.

BACKGROUND

In typical videoconferencing applications, two users receive live video images of each other. In many cases, a user may wish to zoom in on a particular feature that appears in the live video image of the other user. Accordingly, there exists a need for interactive zooming in a videoconferencing application.

DETAILED DESCRIPTION

The following description and the drawings sufficiently illustrate specific embodiments to enable those skilled in the art to practice them. Other embodiments can incorporate structural, logical, electrical, process, and other changes. Portions and features of some embodiments can be included in, or substituted for, those of other embodiments. Embodiments set forth in the claims encompass all available equivalents of those claims.

In a video conferencing application, a user viewing a scene can performing zooming by selecting an area in the scene, then dynamically switching a video feed of the scene to the selected area of the scene. The hardware and software of the video conferencing application can limit the video transmitted to the user to include only the selected area of the scene. Transmitting only the selected area of the scene, and excluding the non-selected area of the scene from transmission, can more efficiently use the available bandwidth of the video conferencing application.

Figure 1:
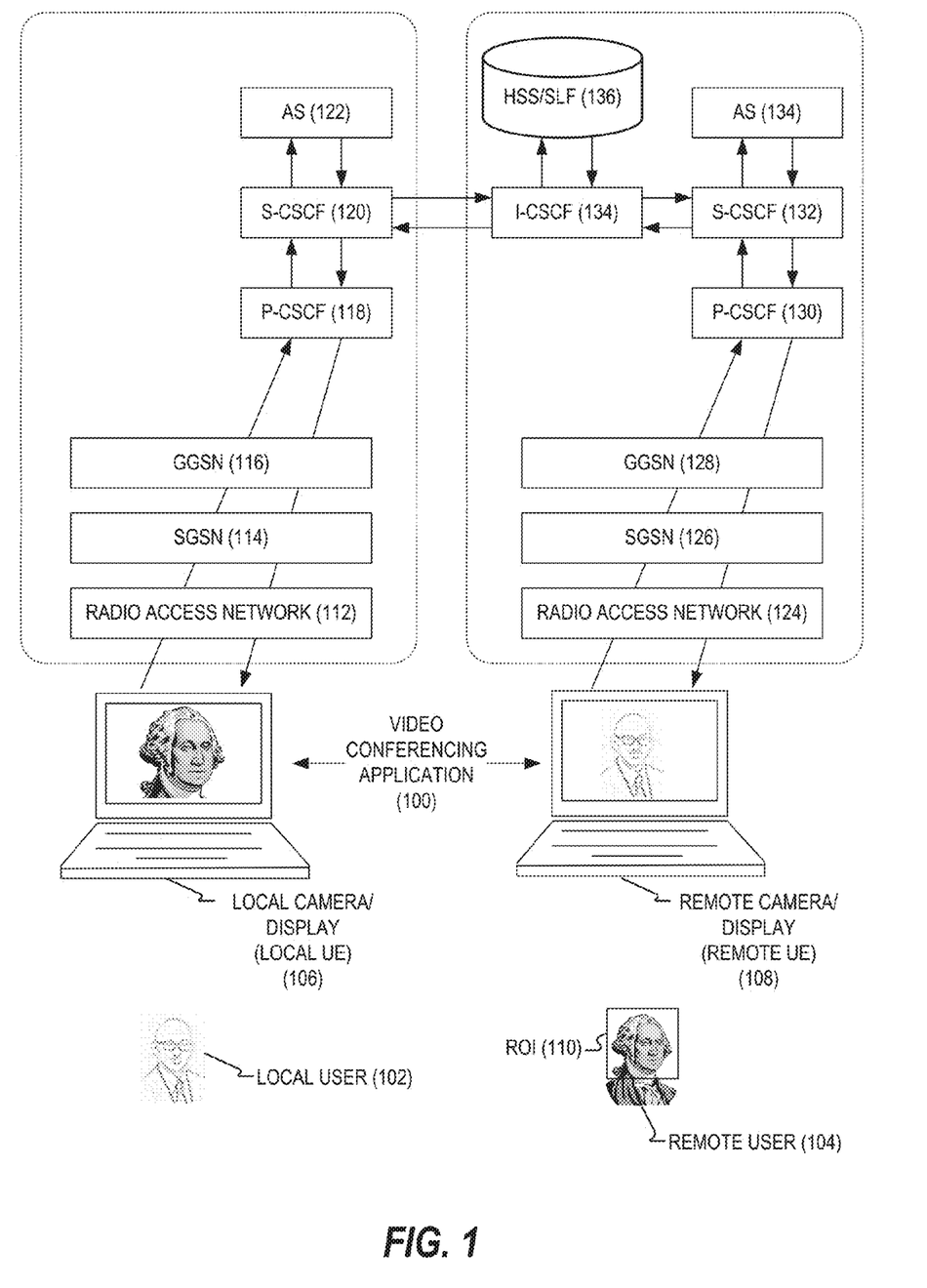
FIG. 1 illustrates an example of an architecture for a video conferencing application.

FIG. 1 illustrates an example of an architecture for a video conferencing application 100. The video conferencing application 100 performs two-way video conferencing between a local user 102 and a remote user 104.

The local user 102 runs the video conferencing application 100 on a local user equipment (local UE) 106, which can include a laptop computer, a cellular telephone, or another suitable device. The local UE 106 includes a camera, which captures video of the local user 102 during operation, and a display, which displays video of the remote user 104 to the local user 102 during operation.

The remote user 104 runs video conferencing application 100 on a remote user equipment (remote UE) 108. The remote UE 108 also includes a camera, which captures video of the remote user 104 during operation, and a display, which displays video of the local user 102 to the remote user 104 during operation. Both the local UE 106 and the remote UE 108 include circuitry configured to perform two-way video conferencing via the video conferencing application 100.

The local user 102 can zoom into a particular feature or location in the field of view of the remote camera. At the local UE 106, the local user 102 can define a region of interest (ROI) 110 within a field of view at the remote UE 108. In the example of FIG. 1, the field of view of the remote camera includes the head and upper torso of the remote user 104, while the ROI 110, defined by the local user 102, includes only the head of the remote user 104. This is but one example; the local user 102 can also define other suitable ROIs within the field of view of the remote camera.

Once an ROI 110 is defined, the video conferencing application 100 can direct the remote UE 108 to capture video within the ROI 110. In some examples, the remote UE 108 captures video that includes only the ROI 110 and excludes regions outside the ROI 110, and transmits the captured video to the local UE 106. In other examples, the remote UE 108 captures video that includes the full field of view of the remote camera 108, but transmits a video that includes only the ROI 110 and excludes regions outside the ROI.

The local UE 106 receives the video from the remote UE 108, where the received video includes regions within the ROI 110 and excludes regions outside the ROI 110. The local UE 106 displays the received video on the local display.

In some examples, the local user 102 can define an ROI 110 to have an arbitrary size and location within the field of view of the remote camera. In some examples, the remote UE 108 remains stationary when the ROI 110 is defined, so that selecting an ROI 110 does not move or change the field of view of the remote camera. In some examples, the local user 102 can select a new ROI 110 at will. In some examples, the remote user 104 can also select an analogous ROI to zoom in on the local user 102.

In the example of FIG. 1, the video conferencing application 100 operates over 3GPP-based multimedia telephony services, which connect the local UE 106 and the remote UE 108 to each other and to the telephone network. This is but one example; other suitable networks can also be used.

The local UE 106 connects to the core network through a radio access network 112, a serving GPRS support node (SGSN) 114, and/or a gateway GPRS support node (GGSN) 116. The local UE 106 sends and receives data through a proxy call session control function (P-CSCF) 118. The P-CSCF sends and receives data with a serving call session control function (S-CSCF) 120. In some examples, the S-CSCF 120 can send and receive data from an application server (AS) 122, which can provide supplementary services, such as call hold/resume, call forwarding and multi-party calls, and others. The S-CSCF 120 can send and receive data from other parts of the core network. The remote UE 108 communicates similarly with its own radio access network 124. SGSN 126, GGSN 128, P-CSCF 130, S-CSCF 132, and AS 134. The S-CSCFs 120, 132 can each communicate with an interrogating CSCF (I-CSCF) 134. The I-CSCF 134 can read and write to a home subscriber server (HSS) 136 and/or a subscriber location function (SLF) 136.

Specification document 3GPP TS 26.114 describes the multimedia telephony services over IMS (MTSI) that allows delivery of advanced multimedia conversational services and content over IMS-based networks. This includes specification of media handling and interaction, which includes media control, media codecs, as well as transport of media and control data. A MTSI call uses the Call Session Control Function (CSCF) mechanisms to route control-plane signalling between the UEs involved in the call. MTSI-based transmitter UE terminal captures and records video, and transfers it to the MTSI-based receiver UE terminal over the 3GPP network, which decodes and renders the video. In MTSI, the session initiation protocol (SIP) serves as the application-layer control protocol to establish, modify, and terminate conversational multimedia sessions, such as video conferences, Internet telephony calls, and others. Session description protocol (SDP) based signaling between the sending and receiving terminals allow for offer/answer considerations in the media-related capability negotiation, including codecs, bitrates, resolutions, and others. The transport of media in MTSI is based on the real-time transport protocol (RTP) (specified by IETF RFC 3550) over UDP/IP.

The resolutions of capture devices and therefore compressed videos are rapidly increasing. For example, using the recent High Efficiency Video Coding (HEVC) standard, one can transport and store 4K content as part of an operational product. Cameras having 4 k-by-2 k resolution are now widely available. Live streaming video has been demonstrated with resolutions of 8 k-by-4 k. Resolutions, in terms of numbers of pixels, are likely to increase in the future. With these very high resolution contents, new usages in video streaming are now possible, like interactive zooming features.

The interactive zooming features enable dynamic adaptation of video in terms of bandwidth, spatial resolution, orientation, and so forth. In addition, the interactive zooming features can dynamically switch to a user-selected area in the video being streamed, and can optimize encodings for this purpose.

The device and method discussed herein proposes new media handling and session management features targeted for conversational video services toward enhancing resolutions delivered to the end user when using interactive zoom features. In particular, towards addressing the problem described above, we propose the capability to signal the information on the user's ROI from the receiving terminal to the sending terminal, e.g., as part of the RTCP feedback signaling or RTP header extension. This feature, named as ROI-based zooming (ROIZoom) can provide better image quality for the selected region than with a simple graphical zoom, since the sending device in this case can use all of the available bandwidth for encoding and transmitting the ROI, which can therefore deliver higher bitrates and quality to the receiving terminal.

Figure 2:
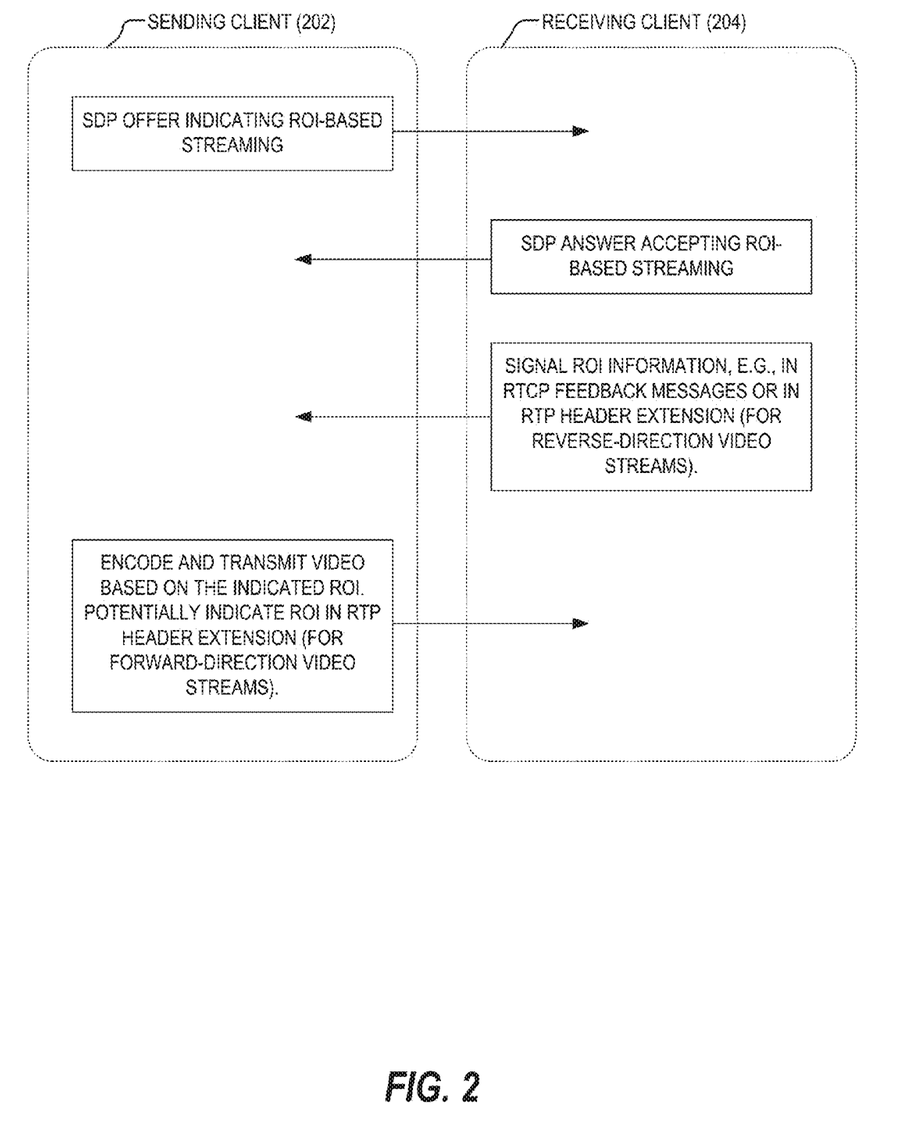
FIG. 2 illustrates an example of a signaling scheme for a video conferencing application.
Figure 3:
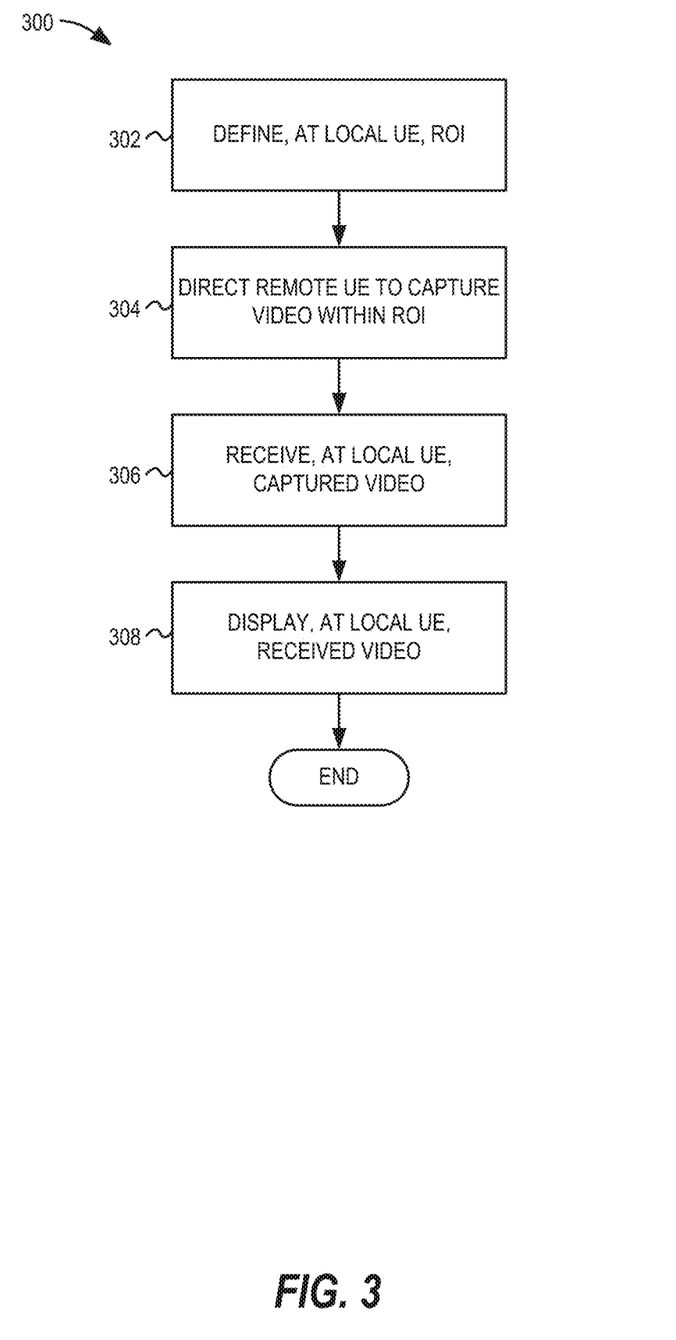
FIG. 3 illustrates a flow chart of an example of a method of operation for a video conferencing application.

FIG. 2 illustrates an example of a signaling scheme for a video conferencing application, such as the video conferencing application 100 of FIG. 1. A sending client 202 sends an offer, via session description protocol (SDP), to a receiving client 204 indicating ROI-based streaming. The receiving client 204 answers, via SDP, and accepts the ROI-based streaming. The receiving client 204 sends the ROI information to the sending client 202, such as in RTCP feedback messages or in RTP header extension for reverse-direction video streams. The sending client 202 encodes and transmits video based on the indicated ROI, potentially indicating an ROI in RTP header extension for forward-direction video streams. This is but one example; other suitable signaling schemes can also be used.

SDP-based signaling between the sending and receiving terminals allow for offer/answer considerations in the media-related capability negotiation for ROI-Zoom, e.g., 1) ability to indicate ROI in RTCP feedback and/or RTP header extension messages and 2) ability to understand/process ROI information and encode video accordingly.

An MTSI client supporting the ROI-Zoom feature can offer ROI-Zoom in SDP for all media streams containing video. ROIZoom can be offered by including the a=extmap attribute indicating the ROI-Zoom URN under the relevant media line scope. For instance, the ROI-Zoom URN can be set as:

urn:3gpp:roi-zoom.

An example of a media line that includes this URN is:

a=extmap:7 urn:3gpp:roi-zoom.

In the above example of a media line, the number 7 can be replaced with any number between 1 and 14, inclusive.

The ROI-Zoom capability can be supported bi-directionally or uni-directionally depending on how clients negotiate to support the feature during SDP capability negotiations. For terminals with asymmetric capability (e.g. the ability to process ROI information but not detect/signal ROI information), the sendonly and recvonly attributes can be used. Terminals should express their capability in each direction sufficiently clearly such that signals are only sent in each direction to the extent that they both express useful information and can be processed by the recipient. ROI-Zoom includes signaling of the current ROI of the receiving user to the sender so that the sending UE can optimally encode and transmit the captured video. When ROI-Zoom is successfully negotiated, it can be signaled by the MTSI client. The signaling of the ROI-Zoom can use RTCP feedback reporting or RTP Header Extensions.

When using RTCP feedback reports, the receiving terminal includes the current ROI information of the user in the RTCP reports it is transmitting to the sending terminal. When using RTP header extensions, the receiving terminal includes the current ROI information of the user in the RTP packets it is transmitting to the sending terminal. These RTP packets carry video streams in the reverse direction, which can be used for bi-directional video communications in MTSI.

These different ROI signaling capabilities can be indicated in the SDP offer via different URNs. In some examples, one can pick one of these and use a single URN in the SDP capability negotiations. Since RTCP is not always used in video calls and can be turned off (this is also part of the SDP negotiation), it can be safest to deliver the ROI information as part of the RTP header extensions of the reverse-direction video streams for broadest support of the ROI-Zoom feature.

Two attributes can be used to define the ROI to be included in RTCP feedback reports or RTP header extensions. One attribute is position, which can specifies an upper left corner of the area covered in the original content, or can specify another suitable location. The other attribute is size, which can specify the size of the area covered in the original content in relative values. For instance, an example of position can be "0:0", and an example of size can be "0.33:0.33". Other suitable values can also be used.

The presence of ROI-Zoom should not impact the negotiated resolutions (based on SDP imageattr attribute) between the sending and receiving terminals. The only difference is that the sending terminal would encode only the ROI with the negotiated resolution rather than the whole captured frame, and this would lead to a higher overall resolution and better user experience than having the receiving terminal zoom in on the ROI and crop out the rest of the frame. The sending terminal can potentially indicate ROI as part of the RTP header extension in RTP packets for its forward-direction video streams.

Table 1 includes an example of an SDP offer indicating ROI-Zoom.

TABLE 1

```
m=video 49154 RTP/AVP 99
a=tcap:1 RTP/AVPF
a=pcfq:1 t=1
b=AS:315
b=RS:0
b=RR:2500
a=rtpmap:99 H264/90000
a=fmtp:99 packetization-mode=0; profile-level-
id=42e00c; \
    sprop-parameter-sets=J0LgDJWgUH6Af1A=,KM46qA==
    a=imageattr:99 send [x=320,y=240] [x=240,y=320]
recv [x=320,y=240] [x=240,y=320]
    a=rtcp-f-b:* trr-int 5000
    a=rtcp-f-b:* nack
    a=rtcp-f-b:* nack pli
    a=rtcp-f-b:* ccm fir
    a=rtcp-f-b:* ccm tmmbr
    a=extmap:4 urn:3gpp:roi-zoom
```

Table 2 includes an example of an SDP answer accepting ROI-Zoom.

TABLE 2

```
m=video 49154 RTP/AVPF 99
a=acfg:1 t=1
b=AS:315
b=RS:0
b=RR:2500
a=rtpmap:99 H264/90000
a=fmtp:99 packetization-mode=0; profile-level-
id=42e00c; \
    sprop-parameter-sets=J0LgDJWgUH6Af1A=,KM46gA==
    a=imageattr:99 send [x=320,y=240] [x=240,y=320]
recv [x=320, y=240] [x=240,y=320]
    a=rtcp-fb:* trr-int 5000
    a=rtcp-fb:* nack
    a=rtcp-fb:* nack pli
    a=rtcp-fb:* ccm fir
    a=rtcp-fb:* ccm tmmbr
    a=extmap:4 urn:3gpp:roi-zoom
```

Although the preceding examples of wireless network connections were provided with specific reference to 3GPP LTE/LTE-A, IEEE 802.11, and Bluetooth communication standards, it will be understood that a variety of other WWAN, WLAN, and WPAN protocols and standards can be used in connection with the techniques described herein. These standards include, but are not limited to, other standards from 3GPP (e.g., HSPA+, UMTS), IEEE 802.16 (e.g., 802.16p), or Bluetooth (e.g., Bluetooth 4.0, or like standards defined by the Bluetooth Special Interest Group) standards families. Other applicable network configurations can be included within the scope of the presently described communication networks. It will be understood that communications on such communication networks can be facilitated using any number of personal area networks, LANs, and WANs, using any combination of wired or wireless transmission mediums.

The embodiments described above can be implemented in one or a combination of hardware, firmware, and software. Various methods or techniques, or certain aspects or portions thereof, can take the form of program code (i.e., instructions) embodied in tangible media, such as flash memory, hard drives, portable storage devices, read-only memory (ROM), random-access memory (RAM), semiconductor memory devices (e.g., Electrically Programmable Read-Only Memory (EPROM). Electrically Erasable Programmable Read-Only Memory (EEPROM)), magnetic disk storage media, optical storage media, and any other machine-readable storage medium or storage device wherein, when the program code is loaded into and executed by a machine, such as a computer or networking device, the machine becomes an apparatus for practicing the various techniques.

A machine-readable storage medium or other storage device can include any non-transitory mechanism for storing information in a form readable by a machine (e.g., a computer). In the case of program code executing on programmable computers, the computing device can include a processor, a storage medium readable by the processor (including volatile and non-volatile memory and/or storage elements), at least one input device, and at least one output device. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

Figure 4:
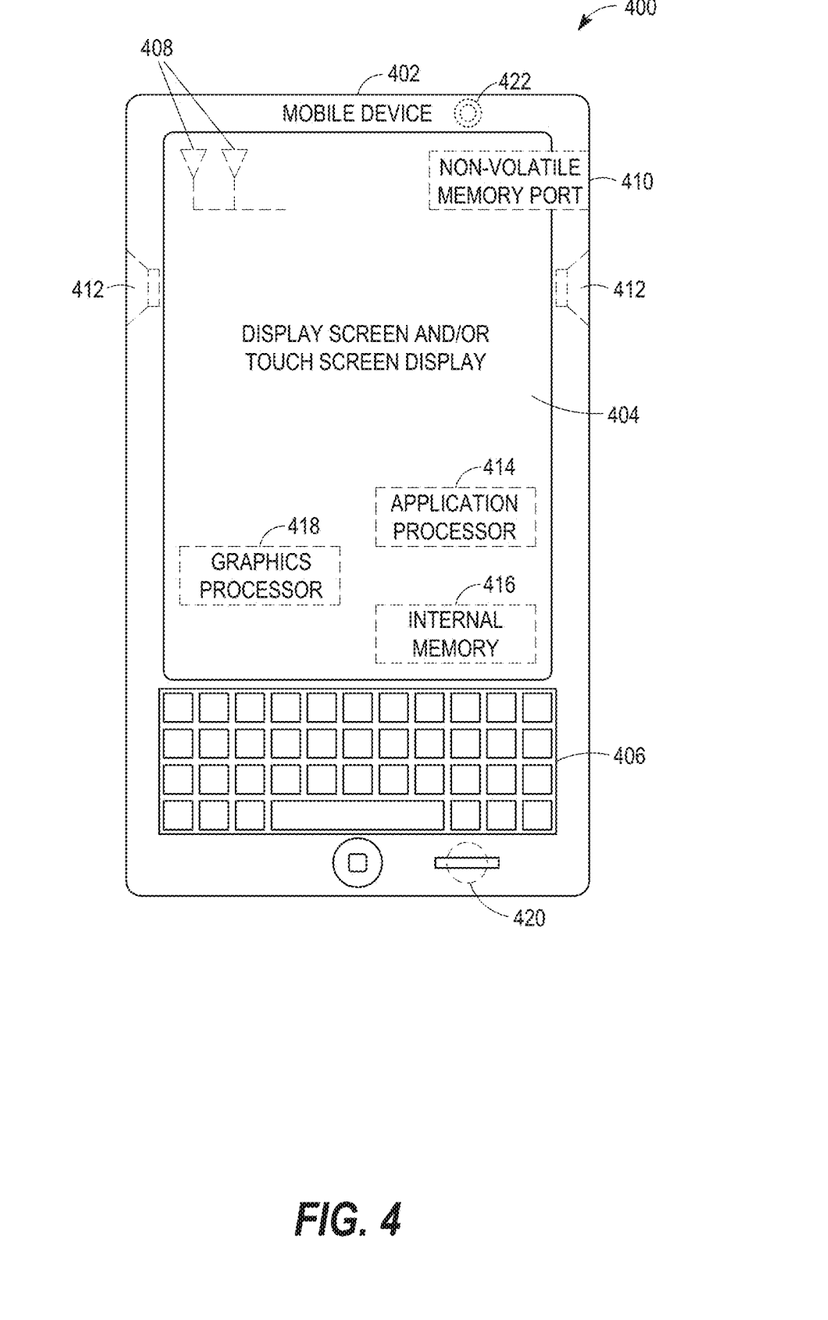
FIG. 4 illustrates an example of a mobile client device on which the configurations and techniques described herein can be deployed.

FIG. 4 illustrates an example of a mobile device 400. The mobile device 400 can be a user equipment (UE), a mobile station (MS), a mobile wireless device, a mobile communication device, a tablet, a handset, or other type of mobile wireless computing device. The mobile device 400 can include one or more antennas 408 within housing 402 that are configured to communicate with a hotspot, base station (BS), an evolved NodeB (eNodeB), or other type of WLAN or WWAN access point. The mobile device 400 can be configured to communicate using multiple wireless communication standards, including standards selected from 3GPP LTE, WiMAX, High Speed Packet Access (HSPA), Bluetooth, and Wi-Fi standard definitions. The mobile device 400 can communicate using separate antennas for each wireless communication standard or shared antennas for multiple wireless communication standards. The mobile device 400 can communicate in a WLAN, a WPAN, and/or a WWAN.

FIG. 4 also shows a microphone 420 and one or more speakers 412 that can be used for audio input and output from the mobile device 400. A display screen 404 can be a liquid crystal display (LCD) screen, or other type of display screen such as an organic light emitting diode (OLED) display. The display screen 404 can be configured as a touch screen. The touch screen can use capacitive, resistive, or another type of touch screen technology. An application processor 414 and a graphics processor 418 can be coupled to internal memory 416 to provide processing and display capabilities. A non-volatile memory port 410 can also be used to provide data input/output options to a user. The non-volatile memory port 410 can also be used to expand the memory capabilities of the mobile device 400. A keyboard 406 can be integrated with the mobile device 400 or wirelessly connected to the mobile device 40) to provide additional user input. A virtual keyboard can also be provided using the touch screen. A camera 422 located on the front (display screen) side or the rear side of the mobile device 400 can also be integrated into the housing 402 of the mobile device 400.

Figure 5:
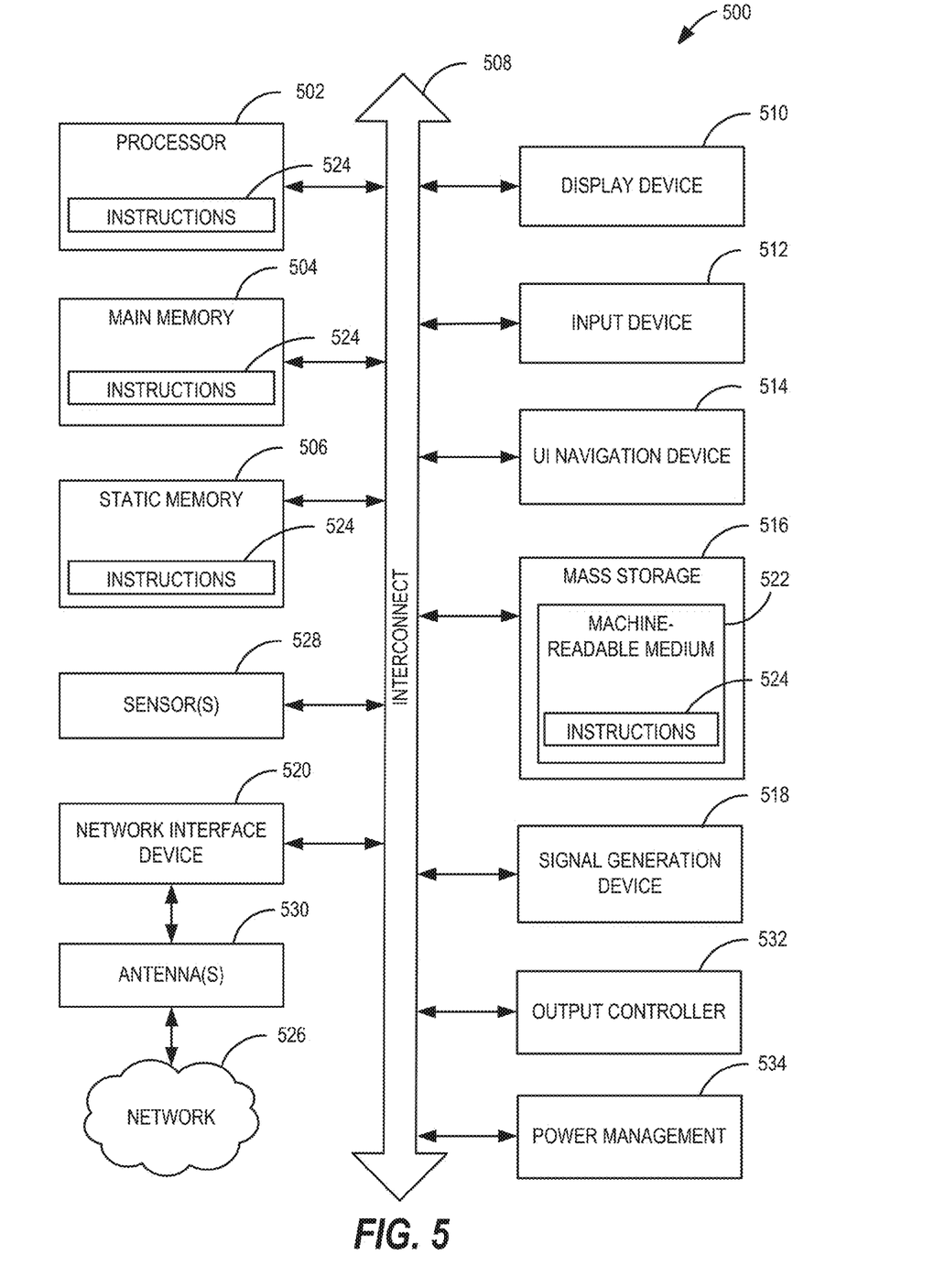
FIG. 5 illustrates an example computer system that can be used as a computing platform for the computing or networking devices described herein.

FIG. 5 is a block diagram illustrating an example computer system machine 500 upon which any one or more of the methodologies herein discussed can be run. Computer system machine 500 can be embodied as the local UE 106, the remote UE 108, or any other computing platform described or referred to herein. In alternative embodiments, the machine operates as a standalone device or can be connected (e.g., networked) to other machines. In a networked deployment, the machine can operate in the capacity of either a server or a client machine in server-client network environments, or it can act as a peer machine in peer-to-peer (or distributed) network environments. The machine can be a personal computer (PC) that may or may not be portable (e.g., a notebook or a netbook), a tablet, a set-top box (STB), a gaming console, a Personal Digital Assistant (PDA), a mobile telephone or smartphone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system machine 500 includes a processor 502 (e.g., a central processing unit (CPU), a graphics processing unit (GPU) or both), a main memory 504 and a static memory 506, which communicate with each other via an interconnect 508 (e.g., a link, a bus, etc.). The computer system machine 500 can further include a video display unit 510, an alphanumeric input device 512 (e.g., a keyboard), and a user interface (UI) navigation device 514 (e.g., a mouse). In one embodiment, the video display unit 510, input device 512 and UI navigation device 514 are a touch screen display. The computer system machine 500 can additionally include a storage device 516 (e.g., a drive unit), a signal generation device 518 (e.g., a speaker), an output controller 532, a power management controller 534, and a network interface device 520 (which can include or operably communicate with one or more antennas 530, transceivers, or other wireless communications hardware), and one or more sensors 528, such as a Global Positioning Sensor (GPS) sensor, compass, location sensor, accelerometer, or other sensor.

The storage device 516 includes a machine-readable medium 522 on which is stored one or more sets of data structures and instructions 524 (e.g., software) embodying or utilized by any one or more of the methodologies or functions described herein. The instructions 524 can also reside, completely or at least partially, within the main memory 504, static memory 506, and/or within the processor 502 during execution thereof by the computer system machine 500, with the main memory 504, static memory 506, and the processor 502 also constituting machine-readable media.

While the machine-readable medium 522 is illustrated in an example embodiment to be a single medium, the term "machine-readable medium" can include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions.

The instructions 524 can further be transmitted or received over a communications network 526 using a transmission medium via the network interface device 520 utilizing any one of a number of well-known transfer protocols (e.g., HTTP). The term "transmission medium" shall be taken to include any intangible medium that is capable of storing, encoding, or carrying instructions for execution by the machine, and includes digital or analog communications signals or other intangible medium to facilitate communication of such software.

It should be understood that the functional units or capabilities described in this specification can have been referred to or labeled as components or modules, in order to more particularly emphasize their implementation independence. For example, a component or module can be implemented as a hardware circuit comprising custom very-large-scale integration (VLSI) circuits or gate arrays, off-the-shelf semiconductors such as logic chips, transistors, or other discrete components. A component or module can also be implemented in programmable hardware devices such as field programmable gate arrays, programmable array logic, programmable logic devices, or the like. Components or modules can also be implemented in software for execution by various types of processors. An identified component or module of executable code can, for instance, comprise one or more physical or logical blocks of computer instructions, which can, for instance, be organized as an object, procedure, or function. Nevertheless, the executables of an identified component or module need not be physically located together, but can comprise disparate instructions stored in different locations which, when joined logically together, comprise the component or module and achieve the stated purpose for the component or module.

Indeed, a component or module of executable code can be a single instruction, or many instructions, and can even be distributed over several different code segments, among different programs, and across several memory devices. Similarly, operational data can be identified and illustrated herein within components or modules, and can be embodied in any suitable form and organized within any suitable type of data structure. The operational data can be collected as a single data set, or can be distributed over different locations including over different storage devices, and can exist, at least partially, merely as electronic signals on a system or network. The components or modules can be passive or active, including agents operable to perform desired functions.

Additional examples of the presently described method, system, and device embodiments include the following, non-limiting configurations. Each of the following non-limiting examples can stand on its own, or can be combined in any permutation or combination with any one or more of the other examples provided below or throughout the present disclosure.

Example 1 includes the subject matter embodied by a method performed by a local user equipment (local UE) for zooming within a video conferencing application that provides two-way video communication between the local UE and a remote user equipment (remote UE), the method including: defining, at the local UE, a user-defined region of interest (ROI) within a field of view at the remote UE; directing the remote UE to capture video within the ROI; receiving, at the local UE, the captured video from the remote UE, the received video including regions within the ROI and excluding regions outside the ROI; and displaying, at the local UE, the received video.

In Example 2, the subject matter of Example 1 can optionally include the method of example 1, wherein directing the remote UE to capture video within the ROI includes indicating the ROI in RTCP feedback reports: and sending the RTCP feedback reports to the remote UE.

In Example 3, the subject matter of Example 1 can optionally include wherein directing the remote UE to capture video within the ROI includes capturing local video at the local UE; embedding the ROI in at least one RTP header extension in the captured local video; and sending the captured local video, with the embedded at least one RTP header extension, to the remote UE.

In Example 4, the subject matter of Example 3 can optionally include the at least one RTP header extension including a position and a size, the position and the size defining the ROI.

In Example 5, the subject matter of Example 4 can optionally include wherein the position includes two position values indicative of a corner position of the ROI within the field of view at the remote UE.

In Example 6, the subject matter of Example 5 can optionally include wherein the two position values are normalized to indicate relative position in two dimensions.

In Example 7, the subject matter of one or any combination of Examples 4-6 can optionally include wherein the size includes two size values indicative of a size of the ROI within the field of view at the remote UE.

In Example 8, the subject matter of Example 7 can optionally include wherein the two size values are normalized to indicate relative size in two dimensions.

In Example 9, the subject matter of one or any combination of Examples 1-8 can optionally include wherein the ROI includes a variable number of pixels; and wherein the received video has a variable refresh rate that is inversely proportional to the number of pixels in the ROI.

In Example 10, the subject matter of one or any combination of Examples 1-9 can optionally include wherein the ROI includes a fixed number of pixels; and wherein the received video has a constant refresh rate.

Example 11 includes the subject matter embodied by a user equipment (UE), including circuitry configured to perform two-way video conferencing between the UE and a remote user equipment (remote UE), the circuitry arranged to: define, at the UE, a user-defined region of interest (ROI) within a field of view at the remote UE; direct the remote UE to capture video within the ROI; receive, at the UE, the captured video from the remote UE, the received video including regions within the ROI and excluding regions outside the ROI; and display, at the UE, the received video.

In Example 12, the subject matter of Example 11 can optionally include the method of example 1, wherein directing the remote UE to capture video within the ROI includes indicating the ROI in RTCP feedback reports: and sending the RTCP feedback reports to the remote UE.

In Example 13, the subject matter of Example 11 can optionally include wherein directing the remote UE to capture video within the ROI includes capturing local video at the local UE; embedding the ROI in at least one RTP header extension in the captured local video; and sending the captured local video, with the embedded at least one RTP header extension, to the remote UE.

In Example 14, the subject matter of Example 13 can optionally include wherein the at least one RTP header extension includes a position and a size, the position and the size defining the ROI.

In Example 15, the subject matter of Example 14 can optionally include wherein the position includes two position values indicative of a corner position of the ROI within the field of view at the remote UE.

In Example 16, the subject matter of Example 15 can optionally include wherein the two position values are normalized to indicate relative position in two dimensions.

In Example 17, the subject matter of one or any combination of Examples 14-16 can optionally include wherein the size includes two size values indicative of a size of the ROI within the field of view at the remote UE.

In Example 18, the subject matter of Example 17 can optionally include wherein the two size values are normalized to indicate relative size in two dimensions.

In Example 19, the subject matter of one or any combination of Examples 11-18 can optionally include wherein the ROI includes a variable number of pixels; and wherein the received video has a variable refresh rate that is inversely proportional to the number of pixels in the ROI.

In Example 20, the subject matter of one or any combination of Examples 11-19 can optionally include wherein the ROI includes a fixed number of pixels; and wherein the received video has a constant refresh rate.

Example 21 includes the subject matter embodied by a method performed by a local user equipment (local UE) for zooming within a video conferencing application that provides two-way video communication between the local UE and a remote user equipment (remote UE), the method including defining, at the local UE, a user-defined region of interest (ROI) within a field of view at the remote UE; capturing local video at the local UE; embedding the ROI in at least one RTP header extension in the captured local video; and sending the captured local video, with the embedded at least one RTP header extension, to the remote UE, the at least one RTP header extension including a position and a size, the position and the size defining the ROI, the position including two position values indicative of a corner position of the ROI within the field of view at the remote UE, the size including two size values indicative of a size of the ROI within the field of view at the remote UE; directing the remote UE to capture video within the ROI: receiving, at the local UE, the captured video from the remote UE, the received video including regions within the ROI and excluding regions outside the ROI; and displaying, at the local UE, the received video.

The Abstract is provided to allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a multimedia telephony services over an IP multimedia subsystem (MTSI) based user equipment (UE) configurable for video Region-of-Interest (ROI) signaling and operation as an MTSI sender, the apparatus comprising:
  memory; and
  processing circuitry configured to:
  perform a Session Description Protocol (SDP) capability negotiation with a MTSI receiver;
  provide a set of predefined ROIs to the MTSI receiver during the SDP capability negotiation;
  receive signaling for one of the predefined ROIs in RTCP feedback reports from the MTSI receiver when the MTSI receiver is operating in a predefined ROI mode; and
  encode a region corresponding to the one of the predefined ROIs of a captured frame, the encoded video comprises the encoded region of the captured frame and refrain from encoding video outside the predefined ROI of the captured frame.

2. The apparatus of claim 1, wherein the processing circuitry is configured to:
  signal, to the MTSI receiver, video Region-of-Interest (ROI) information for a first ROI of the MTSI receiver in real-time protocol (RTP) packets, the RTP packets to include at least a zoom command to capture the first ROI, the first ROI being a requested ROI of the MTSI receiver; and
  decode received RTP payload packets from the MTSI receiver, the RTP payload packets comprising video corresponding to the first ROI.

3. The apparatus of claim 2, wherein the processing circuitry is configured to:
  receive signaling in RTCP feedback reports from the MTSI receiver requesting a second ROI, the second ROI provided during a second SDP capability negotiation, the second ROI being a predefined ROI of the MTSI sender; and
  encode a region corresponding to the second ROI of a captured frame with the negotiated resolution, the encoded video comprises the encoded region of the captured frame.

4. The apparatus of claim 1, the SDP capability negotiation comprising a resolution of the one of the predefined ROIs.

5. The apparatus of claim 4, the encoded region having the negotiated resolution.

6. The apparatus of claim 5, wherein only the encoded region is encoded with the negotiated resolution.

7. The apparatus of claim 1, wherein the processing circuitry is configured to encode a region of a captured frame corresponding to the one of the predefined ROIs and refrain from encoding outside the one of the predefined ROIs of the captured frame, the encoded video comprising the encoded region of the captured frame.

8. The apparatus of claim 2, further comprising a display to display the decoded received RTP payload packets received from the MTSI sender.

9. The apparatus of claim 8, further comprising two or more antennas to receive the RTP packets from an enhanced node B (eNB).

10. A non-transitory computer-readable storage medium that stores instructions for execution by processing circuitry of a multimedia telephony services over an IP multimedia subsystem (MTSI) based user equipment (UE) configurable for video Region-of-Interest (ROI) signaling and operation as an MTSI sender, the instructions to configure the UE to:
  perform a Session Description Protocol (SDP) capability negotiation with a MTSI receiver;
  provide a set of predefined ROIs to the MTSI receiver during the SDP capability negotiation;
  receive signaling for one of the predefined ROIs in RTCP feedback reports from the MTSI receiver when the MTSI receiver is operating in a predefined ROI mode; and
  encode a region corresponding to the one of the predefined ROIs of a captured frame, the encoded video comprises the encoded region of the captured frame and refrain from encoding video outside the predefined ROI of the captured frame.

11. The non-transitory computer-readable storage medium of claim 10, wherein the instructions further configure the UE to:
  signal, to the MTSI receiver, video Region-of-Interest (ROI) information for a first ROI of the MTSI receiver in real-time protocol (RTP) packets, the RTP packets to include at least a zoom command to capture the first ROI, the first ROI being a requested ROI of the MTSI receiver; and
  decode received RIP payload packets from the MTSI receiver, the RIP payload packets comprising video corresponding to the first ROI.

12. The non-transitory computer-readable storage medium of claim 11, wherein the instructions further configure the UE to:
  receive signaling in RTCP feedback reports from the MTSI receiver requesting a second ROI, the second ROI provided during a second SDP capability negotiation, the second ROI being a predefined ROI of the MTSI sender; and
  encode a region corresponding to the second ROI of a captured frame with the negotiated resolution, the encoded video comprises the encoded region of the captured frame.

13. The non-transitory computer-readable storage medium of claim 10, the SDP capability negotiation comprising a resolution of the one of the predefined ROIs.

14. The non-transitory computer-readable storage medium of claim 13, the encoded region having the negotiated resolution.

15. The non-transitory computer-readable storage medium of claim 14, wherein only the encoded region is encoded with the negotiated resolution.

16. The non-transitory computer-readable storage medium of claim 10, wherein the instructions further configure the UE to encode a region of a captured frame corresponding to the one of the predefined ROIs and refrain from encoding outside the one of the predefined ROIs of the captured frame, the encoded video comprising the encoded region of the captured frame.

17. The non-transitory computer-readable storage medium of claim 10, wherein the instructions further configure the UE to display the decoded received RTP payload packets received from the MTSI sender.

18. An apparatus of a multimedia telephony services over an IP multimedia subsystem (MTSI) based user equipment (UE) configurable for video Region-of-Interest (ROI) signaling and operation as an MTSI receiver, the apparatus comprising:
  memory; and
  processing circuitry configured to:
  perform a Session Description Protocol (SDP) capability negotiation with a MTSI sender;
  obtain a set of predefined ROIs from the MTSI sender during the SDP capability negotiation;
  operate in a predefined ROI mode;

encode information to signal one of the predefined ROIs in RTCP feedback reports; and decode a region corresponding to the one of the predefined ROIs of a captured frame, the encoded video comprises the encoded region of the captured frame, the video outside the predefined ROI of the captured frame is refrained from encoding.

19. The apparatus of claim 18, wherein the processing circuitry is configured to:

receive, from the MTSI sender, video Region-of-Interest (ROI) information for a first ROI of the MTSI receiver in real-time protocol (RTP) packets, the RTP packets to include at least a zoom command to capture the first ROI, the first ROI being a requested ROI of the MTSI receiver; and encode RTP payload packets for the MTSI sender, the RTP payload packets comprising video corresponding to the first ROI.

20. The apparatus of claim 19, wherein the processing circuitry is configured to:

encode signaling in RTCP feedback reports to the MTSI sender requesting a second ROI, the second ROI provided during a second SDP capability negotiation, the second ROI being a predefined ROI of the MTSI sender; and decode a region corresponding to the second ROI of a captured frame with the negotiated resolution, the encoded video comprises the region of the captured frame.

21. The apparatus of claim 18, the SDP capability negotiation comprising a resolution of the one of the predefined ROIs.

22. The apparatus of claim 21, the encoded region having the negotiated resolution.

23. The apparatus of claim 22, wherein only the encoded region is encoded with the negotiated resolution.

24. The apparatus of claim 18, wherein the processing circuitry is configured to decode a region of a captured frame corresponding to the one of the predefined ROIs and refrain from encoding outside the one of the predefined ROIs of the captured frame, the decoded video comprising the region of the captured frame.

25. The apparatus of claim 19, further comprising two or more antennas to transmit the RTP packets from an enhanced node B (eNB).

* * * * *

UNITED STATES PATENT AND TRADEMARK OFFICE
CERTIFICATE OF CORRECTION

PATENT NO. : 10,225,817 B2  Page 1 of 1
APPLICATION NO. : 15/682168
DATED : March 5, 2019
INVENTOR(S) : Ozgur Oyman It is certified that error appears in the above-identified patent and that said Letters Patent is hereby corrected as shown below:

On the Title Page

On page 5, in Column 1, item (56) under "Other Publications", Line 60, delete "Resposne" and insert --Response-- therefor On page 6, in Column 2, item (56) under "Other Publications", Line 61, delete "INS SystemS" and insert --IMS Systems-- therefor On page 6, in Column 2, item (56) under "Other Publications", Line 67, delete "capabilities"," and insert --capabilities",-- therefor

On page 7, in Column 1, item (56) under "Other Publications", Line 29, delete "Supression" and insert --Suppression-- therefor In the Claims In Column 12, Line 21, in Claim 11, delete "RIP" and insert --RTP-- therefor In Column 12, Line 22, in Claim 11, delete "RIP" and insert --RTP-- therefor Signed and Sealed this
Fifth Day of May, 2020

Andrei Iancu
*Director of the United States Patent and Trademark Office*